United States Patent Office 3,824,212
Patented July 16, 1974

3,824,212
PROCESS FOR PREPARING HIGHER MOLECULAR WEIGHT POLYEPOXIDE PRODUCTS BY REACTING A POLYEPOXIDE WITH A PHENOL IN PRESENCE OF TETRAALKYLAMMONIUM HALIDES
Feije H. Sinnema and Henry van Zwet, Amsterdam, Netherlands, assignors to Shell Oil Company, New York, N.Y.
No Drawing. Filed Jan. 18, 1973, Ser. No. 324,698
Claims priority, application Great Britain, Jan. 21, 1972, 3,101/72
Int. Cl. C08g 30/04
U.S. Cl. 260—47 EP                13 Claims

ABSTRACT OF THE DISCLOSURE

A process for preparing higher molecular weight polyepoxide compounds from lower molecular weight polyepoxides by condensing said lower molecular weight polyepoxides (i.e., below about 3500) with a polyhydric phenol in the presence of a tetraalkylammonium halides catalysts employed within a certain critical range and at a certain critical temperature range is disclosed. More particularly, solid epoxy resins are prepared by the fusion of diphenylol propane with a low molecular weight epoxy resin at 140 to 190° C. in the presence of 0.05 to 2 meq. of a tetraalkylammonium chloride or bromide per 100 g. of epoxy resin in the presence of less than 1% by weight of a high boiling solvent.

BACKGROUND OF THE INVENTION

Field of the Invention

This invention relates to a process for preparing higher molecular weight epoxy resins by condensing or reacting a lower molecular weight epoxy resin, i.e., less than 3500, with a polyhydric phenol at 120° to 200° C. in the presence of a critical amount of a tetraalkylammonium halide catalyst.

Prior Art

It has previously been proposed to prepare polyepoxides of high molecular weight by a two-step process, wherein, in the first step, an initial, lower-molecular-weight polyepoxide is produced by the reaction of a polyhydric phenol and epichlorohydrin in the presence of an alkaline compound in a sufficient amount to combine with the chlorine of the chlorohydrin, followed by removal of the by-product salt and any excess alkali with addition in the second step of a polyhydric phenol to the initial polyepoxide and heating the resulting mixture to effect reaction of the polyhydric phenol with the initial polyepoxide to form polyepoxides with a higher melting point and higher molecular weight. As a matter of fact, said two steps may be carried out independently of each other, and frequently are.

Various catalysts have been proposed and are being used in this second fusion-reaction step, such as inorganic bases, tertiary amines, quaternary ammonium bases, phosphines and quaternary phosphonium compounds. A number of disadvantages is associated with the use of such catalyst as is known in the art and as we have found in the course of our investigations. Thus, bases and amines are also effective catalysts for competing reactions of epoxides with alcoholic OH groups and the like. As a result, the products do not possess optimal performance and utility. In this respect phosphines and phosphonium halides proved to be superior catalysts in that the fusion reaction between the polyhydric phenol and the polyepoxide starting material is cleaner with less side reactions. See, for example, U.S. 3,477,990 and U.S. 3,547,881.

Phosphines, however, appeared to be sensitive to residues of ketonic solvents such as methyl-isobutyl ketone, and saponifiable chlorine—both resulting from the method of working up of the polyepoxide starting material, and to oxygen. These sensitivities necessitate a number of additional precautions such as purging of the reactor with nitrogen and careful selection and/or purification of starting materials.

Other catalysts have also been proposed for similar condensation reactions. See, for example U.S. 2,615,008 directed to the use of alkali metal hydroxides; U.S. 2,506,-486 directed to the use of quaternary ammonium compounds; French 1,325,223 directed to the use of triethylamine; and Netherlands 6413068 and 6507192 directed to quaternary ammonium salts.

It has now been found that alkylammonium halides, in particular tetraalkylammonium halides, employed within a certain critical range and a a certain critical temperature range, form a class of catalysts which obviates the disadvantages of the prior art catalysts in the fusion-reaction.

SUMMARY OF THE INVENTION

Accordingly, this invention provides a process for the preparation of a polyepoxide product by condensing a polyhydric phenol at a temperature of 120–200° C. with a polyepoxide starting material having a lower molecular weight than the polyepoxide product (i.e. below 3500, preferably below 2000) in the presence of less than 1% by weight, preferably less than 0.5% by weight based on polyepoxide starting material, of an inert solvent having an atmospheric boiling point of at least 140° C. and which is miscible with the polyepoxide product and reactants, the initial ratio of phenolic hydroxyl groups to epoxy groups being at least 1:1.05, and preferably from 1:1.1 to 1:7.5, in which the said condensation is effected in the presence of 0.05 to 2.0, preferably 0.1 to 0.4, millequivalents of a quaternary alkylammonium halide catalyst per 100 g. of polyepoxide starting material.

PREFERRED EMBODIMENTS

In our copending patent application Ser. No. 238,529, filed Mar. 27, 1972, a similar fusion-condensation is described in the presence of 1–15% w. of the inert solvent having a boiling point above 140° C. The solvent should not significantly react with epoxide groups. A solvent is considered to be inert if it will increase the WPE of a polyepoxide not more than 20% when the polyepoxide is heated for half an hour at 185° C. in the presence of 10% by weight of the solvent and 0.08 meq. NaOH per 100 g. of polyepoxide. Catalysts mentioned in said patent application, are, inter alia, quaternary ammonium salts, such as tetraalkylammonium chloride; however, the use of such catalysts is not claimed therein.

The present invention is preferably carried out in the absence of any solvent, i.e., in the absence of more than 0.2% by weight of solvent based on the polyepoxide starting material.

The Polyepoxide Starting Material

The term polyepoxides as used herein means a compound having on the average more than one vic-epoxide group

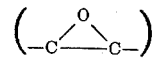

per molecule. The polyepoxide starting materials may be saturated or unsaturated, aliphatic, cycloaliphatic, aromatic or heterocyclic and may, if desired, contain noninterfering substituents, such as halogen atoms, hydroxyl groups, ether groups and ester groups.

Various examples of polyepoxides that are suitable include those described in U.S. 2,633,458 and U.S. 3,477,990, and it is understood that so much of the disclosure of these patents relevant to polyepoxides is incorporated by reference into this specification.

Very suitable polyepoxide starting materials are glycidyl polyethers of polyhydric phenols (such as novolac resins) and in particular of dihydric phenols, such as 1,1-bis(4-hydroxyphenyl)ethane, bis(4 - hydroxyphenyl)methane, bis(4-hydroxyphenyl)sulfone and the preferred 2,2-bis(4-hydroxyphenyl)propane.

The term "lower molecular weight" in relation to the polyepoxide starting materials is used herein to mean polyepoxides having a molecular weight below 3500. Polyepoxides having a molecular weight in the range of approximately 350 to approximately 1750 are preferred. The polyepoxide products have a higher molecular weight than the polyepoxides used as starting material. Thus, if the polyepoxide starting material has a molecular weight of 750 the product must have a molecular weight of above 750. The product will also have a higher melting point than the polyepoxide starting material has. Depending on the ratio of the polyhydric phenol to the lower-molecular-weight polyepoxide employed, polyepoxides with molecular weights of from about 500 to 7000 (epoxy content of 0.3–4 epoxide equivalents per kg.) may be readily obtained.

The Polyhydric Phenols

The polyhydric phenols used in the process of the invention are those compounds which possess at least two OH-groups attached to an aromatic nucleus. The phenols may contain a great variety of substituents of different types.

Various suitable examples of polyhydric phenols are described in U.S. 3,477,990 and so much of that patent disclosure relevant to examples of polyhydric phenols is incorporated by reference into this specification.

Preferred polyhydric phenols are bisphenols, in particular 2,2-bis(hydroxyphenyl)propane or diphenylolpropane, often abbreviated to "DPP." In DPP the hydroxy groups may be in the para- and/or ortho-position. Bisphenols are compounds in which two phenylol groups are bound together, either directly or via an intermediate group, such as a methylene group. The ortho-position is preferred (commonly called bisphenol A or BPA).

Reaction Conditions

Careful control of the ratio of the phenol to the polyepoxide starting material is of great importance in order to obtain a product having the desired characteristics. When technical grades of one or several reagents are employed, the correct ratio is determined on the basis of the epoxy equivalence and the phenolic hydroxyl equivalence of the starting reagents. Reaction mixtures should contain not less than 1.05, in particular not less than 1.1 and not more than 7.5 vic-epoxide groups per phenolic hydroxyl group. When starting from a polyepoxide having a molecular weight between 350 and 500, epoxy-to-phenolic hydroxyl ratios in the range from 1.5:1 to 2.5:1 are suitably employed.

The temperature at which, the condensation reaction is carried out may be varied within certain limits, but should be high enough to keep the reactants in the liquid state. Very suitable temperatures are between about 140 and 190° C., preferably between about 160 and 175° C. At elevated temperatures, in particular above 180° C., the catalytic activity tends to decrease. It may be advantageous, in particular in the preparation of higher mol weight polyepoxides to start the fusion reaction at a temperature below 175° C. and after reaching substantial conversion, raising the temperature to a value above 175° C.

The condensation reaction between a polyhydric phenol and a polyepoxide to produce the desired polyepoxide is effected in the presence of a quaternary alkylammonium halide condensation catalyst. Suitable catalysts which can be employed according to the invention are glycidyltrimethylammonium chloride, phenyltrimethylammonium iodide, tetramethylammonium chloride, tetraethylammonium chloride, tetramethylammonium bromide, benzyltrimethylammonium chloride, hexadecyltrimethylammonium bromide and dodecyl triethylammonium bromide. A preferred group of catalysts is formed by the tetraalkylammonium halides, among which tetramethylammonium chloride proved to be a very suitable catalyst.

The catalyst may be added as such or as a solution in an organic or inorganic solvent. It has been found that the homogeneous distribution of the catalyst is more easily achieved if it is employed as an aqueous solution.

The higher the initial ratio of phenolic hydroxyl groups to epoxy groups, the higher the molecular weight of the polyepoxide product will be and the more catalyst will be required, as may be apparent from the following examples.

Stepwise addition of polyhydric phenol will result in an easier controllable exotherm and might lead to a different molecular weight distribution of the polyepoxide product. In this case it is desirable that the catalyst is also added stepwise, which can, for example, be done by dividing the total amount of catalyst in ratios equal to the ratio of polyhydric phenol portions.

These high molecular weight polyepoxides are particularly useful in preparing surface coatings, adhesives, laminates, filament windings, etc. Those prepared from halogenated polyhydric phenols may be suitable as flame proofing resins.

These high molecular weight polyepoxide can be reacted with conventional epoxy curing agents to form hard, insoluble infusible products. Numerous examples of suitable types of curing agents are disclosed in U.S. 3,477,990, and so much of that patent disclosure relevant to epoxy curing agents is incorporated by reference into this specification. Other suitable curing agents such as the imidazole compounds and their salts will be readily apparent to one skilled in the art.

In order to illustrate the invention more fully some specific examples are given. The reactants, their proportions and other specific ingredients are presented as being typical and various modifications can be made in view of the foregoing disclosure and discussion without departing from the spirit or scope of the specification or of the claims. Unless otherwise stated, parts and percentages are by weight.

Solvents or diluents may also be added to these products to make the composition more fluid or sprayable. Preferred solvents include those which are volatile such as esters, including ethyl acetate, butyl acetate, ethylene glycol monoacetate; ether alcohols such as methyl, ethyl, butyl ether of ethylene or diethylene glycol; chlorinated hydrocarbons such as carbon tetrachloride; aromatic hydrocarbons such as benzene, toluene, xylenes, etc.; and alcohols such as methanol, ethanol, propanol, etc.

Other materials may be added as desired such as fillers, plasticizers, stabilizers, asphalts, tars, resins, insecticides, fungicides, anti-oxidants, pigments, and the like.

EXAMPLE I

All experiments were carried out in stirred glass reactors under a blanket of nitrogen but no precautions were taken to remove all traces of oxygen. The starting materials for the fusion condensation reaction in the absence of solvent were 3 types of diglycidyl ether of diphenylol propane (DPP) hereinafter referred to as "DGEB" and 2 types of DPP having the following specifications:

| | DGEB-I | DGEB-II | DGEB-III |
|---|---|---|---|
| Based on DPP-type | I | II | II |
| WPE | 192 | 188 | 190 |
| Saponifiable Cl, percent by weight | 0.23 | 0.03 | 0.21 |
| Viscosity, poises | 133 | 136 | 105 |

NOTE.—WPE = Weight per epoxy group.

DPP–I consisted of pure 2,2-bis(4-hydroxyphenyl)propane while DPP–II contained 4% by weight 2-(4-hydroxyphenyl)-2-(2-hydroxyphenyl)propane, besides 95.5% by weight 2,2-bis(4-hydroxyphenyl)propane.

The DGEB and the catalyst (tetramethylammonium chloride, TMAC) were weighted and brought into the reactor, then brought to a temperature of 140° C., whereupon the DPP was added and the temperature further raised to the desired reaction temperature of 165° C. Reaction conditions and results appear in Table I.

TABLE I

| Experiment | A | B | C | D | E | F |
|---|---|---|---|---|---|---|
| DGEB-type | I | II | II | III | II | II |
| DPP-type | I | I | II | II | II | II |
| DGEB/DPP, weight ratio | 3.69 | 3.61 | 3.61 | 3.61 | 2.47 | 1.99 |
| Catalyst, meq./100 g. of DGEB plus DPP | 0.091 | 0.18 | 0.091 | 0.091 | 0.14 | 0.27 |
| Polyepoxide product; WPE after— | | | | | | |
| 1 hour | 44.6 | 471 | 451 | 441 | 818 | 1,695 |
| 2 hours | 461 | | 457 | 451 | 845 | 1,820 |
| 3 hours | 464 | 488 | 460 | 460 | 850 | 1,870 |
| 5 hours | 468 | 491 | 462 | 461 | 860 | 1,912 |
| Viscosity, poises (40% by weight solution in butyldioxitol), at 25° C. * | 1.63 | 1.94 | 1.61 | 1.56 | 5.84 | 34.9 |
| Gardner color * | 2− | 2− | 1+ | 1 | 1+ | |
| Phenolic OH, meq./100 g. * | <1 | <1 | 4 | 4 | 2.5 | 7.7 |

*Of final product obtained after 5 hours reaction.

From these results it appears that although the reaction was finished after about 1–2 hours, the product properties do not change markedly by extended reaction periods which is an indication of the selectivity of the catalyst.

EXAMPLE II

Polyepoxide final products A, B, C and D were cured with "Versamid" 115 (registered trademark for a polyamino amide) in a weight ratio of polyepoxide "Versamid" of 2:1. The compositions were pigmented with titania ("Kronos" RN 56, R.T.M.) in a pigment/binder ratio of 0.8. The compositions were diluted to a suitable spraying viscosity (45% solids) with a mixture of 30% by weight of methylisobutylketone, 60% by weight of toluene and 10% by weight of oxitol, and subsequently applied on steel panels in a thickness of 30–35 μm. The coatings were cured for 7 days at 23° C. Properties of the cured coatings are tabulated in Table II.

TABLE II

| Polyepoxide product | A | B | C | D |
|---|---|---|---|---|
| Whiteness | 89.5 | 90.3 | 90.2 | 90.0 |
| Gloss | 100 | 100 | 100 | 100 |
| Buchholz hardness | 83 | 80 | 95 | 87 |
| Pencil hardness | HB | HB | F | F |
| B.S. impact, cm. kg. * | >115 | >115 | 23–70 | 93 |
| Erichsen impact, mm | >6 | >6 | 2–5 | >6 |
| Erichsen penetration, mm | >8 | >8 | >8 | >8 |
| Mandrel bend | ¼« | ¼« | ¹⁄₁₆ | ¼« |
| Solvent resistance after 15 min. in— | | | | |
| Xylene | HB | HB | F | F |
| Methylisobutylketone | B | HB | F | HB |

* British Standard 1391-1952.

EXAMPLE III

A series of experiments was performed in order to find the optimal amount of TMAC in the preparation of a fusion resin having a calculated WPE of 1740. DGEB–II and DPP–II were used in a weight ratio of 2:1. The reaction temperature was 165° C., the reaction time 2 hours and the procedure in other respects being as disclosed in Example I. The results are tabulated in Table III.

TABLE III

| Experiment | G | H | J | K | L | M |
|---|---|---|---|---|---|---|
| TMAC, meq./100 g. DGEB plus DPP | *0.14 | 0.18 | *0.18 | *0.18 | 0.23 | *0.23 |
| Product: WPE | 1,615 | 1,687 | 1,740 | 1,736 | 1,792 | 1,821 |
| Viscosity, poises * | 18.9 | — | 25.1 | 25.6 | 27.1 | 30.1 |
| Color, Gardner | <1 | <1 | <1 | <1 | <1 | <1 |
| Phenolic OH, meq./100 g | — | — | 10.1 | 9.4 | — | — |

* As a 40% solution in butyldioxitol at 25° C.
*Added as a 50% by weight aqueous solution.
NOTE: —=not determined.

From these figures it can be seen that 0.14 meq. TMAC/100 g. DGEB+DPP is not sufficient to finish the reaction in a reasonable time (2–3 hours). The calculated WPE of 1740 will be reached in 2 hours if 0.18 meq./100 g. are used.

EXAMPLE IV

Two other ammonium catalysts were used in experiments substantially as described in Example I. The catalysts were hexadecyltrimethylammonium bromide (HTAB) and glycidyltrimethylammonium chloride (GMAC), used in amounts of 0.12 and 0.31 meq./100 g. (DGEB+DPP), respectively. DPP–II and DGEB–II were used in a weight ratio of 1:2.47, resulting in a calculated WPE of 820. Reaction time was 2 hours, reaction temperature 165° C. Product properties were as follows:

| Experiment | N | O |
|---|---|---|
| Catalyst | HTAB | GMAC |
| WPE | 822 | 843 |
| Viscosity, P (40% by weight solution) 25° C | 5.33 | 5.74 |
| Color, Gardner | <1 | <1 |

EXAMPLE V

Starting materials were DPP–II and a polyglycidyl ether of DPP–I, having a WPE of 241, a viscosity of 5.45 poises at 25° C. (as a 70% by weight solution in butyldioxitol) and a saponifiable chlorine content of 0.06% by weight. Essentially as described in Example I the starting materials (DPP/polyepoxide) were reacted at 165° C. for 5 hours in a weight ratio of 1:5.7 so as to provide a calculated WPE of 455. The amount of TMAC was 0.093 meq./100 g. of the reactants. The polyepoxide product had a WPE of 472, a viscosity at 25° C. of 1.71 poises (40% by weight solution in butyldioxitol), and a phenolic OH-content of 2.3 meq./100 g.

EXAMPLE VI

Starting materials were DPP–II and DGEB–II, employed in a weight ratio of 1:1.85. The amount of catalyst (TMAC) was 0.23 meq./100 g. DGEB+DPP. Essentially as described in Example I, the starting materials were combined at 140° C., whereupon the temperature dropped to 111° C. In 2 hours the temperature was raised to 190° C., and kept at this temperature for a further 3 hours. Product properties: WPE 2745 (calcd. 2800), viscosity 58.1 poises at 25° C. (40% by weight solution in butyldioxitol), Gardner color 1 (40% by weight solution in butyldioxitol), phenolic hydroxyl 14.4 meq./100 g.

We claim as our invention:

1. A process for the preparation of a polyepoxide condensation product which comprises reacting (1) a polyhydric phenol with (2) a polyepoxide starting material having a lower molecular weight than the polyepoxide product, which is below 3500, at 120 to 2000° C. in the presence of less than 1% by weight, based on polyepoxide starting material, of an inert solvent having an atmospheric boiling point of at least 140° C. and which is miscible with the polyepoxide product and reactants, the initial ratio of phenolic hydroxyl groups to epoxy groups being at least 1:1.05, the said reaction being performed in the presence of 0.05 to 2 milliequivalents of a quaternary alkylammonium halide catalyst per 100 grams of polyepoxide starting material.

2. A process as in claim 1 wherein the polyepoxide starting material has a molecular weight between 350 and 1750.

3. A process as in claim 1 wherein the reaction is effected in the presence of less than 0.5% by weight of the inert solvent.

4. A process as in claim 1 wherein the catalyst is used in an amount of 0.1 to 0.4 milliequivalents per 100 g. of polyepoxide starting material.

5. A process as in claim 1 wherein the condensation is effected at a temperature between 140 and 190° C.

6. A process as in claim 1 wherein the initial ratio of phenolic hydroxyl groups to epoxy groups is from 1:1.1 to 1:7.5.

7. A process as in claim 6 wherein the said initial ratio is from 1:1.5 to 1:2.5.

8. A process as in claim 1 wherein the polyepoxide starting material is a glycidyl polyether of a dihydric phenol.

9. A process as in claim 8 wherein the polyepoxide starting material is the diglycidyl ether of 2,2-bis(4-hydroxyphenyl)propane.

10. A process as in claim 1 wherein the polyhydric phenol is a bisphenol.

11. A process as in claim 10 wherein the bisphenol is 2,2-bis(4-hydroxyphenyl)propane.

12. A process as in claim 1 wherein the catalyst is a tetraalkylammonium halide.

13. A process as in claim 12 wherein the catalyst is tetramethylammonium chloride.

References Cited

UNITED STATES PATENTS

| | | | |
|---|---|---|---|
| 3,477,990 | 11/1969 | Dante et al. | 260—47 |
| 2,928,803 | 3/1960 | Belanger et al. | 260—47 |
| 3,687,894 | 9/1972 | Collings et al. | 260—47 |

WILLIAM H. SHORT, Primary Examiner

T. E. PERTILLA, Asssitant Examiner

U.S. Cl. X.R.

260—47 EN